United States Patent [19]

Persson

[11] Patent Number: 5,487,174
[45] Date of Patent: Jan. 23, 1996

[54] METHODS IN A CELLULAR MOBILE RADIO COMMUNICATION SYSTEM

[75] Inventor: Bengt Y. Persson, Djursholm, Sweden

[73] Assignee: Telefonaktiebolaget LM Ericsson, Stockholm, Sweden

[21] Appl. No.: 35,797

[22] Filed: Mar. 23, 1993

[30] Foreign Application Priority Data

Mar. 24, 1992 [SE] Sweden .................................. 9200915

[51] Int. Cl.⁶ .................................................. H04Q 7/22
[52] U.S. Cl. ...................... 455/33.2; 455/33.4; 455/54.1; 379/60
[58] Field of Search ................................. 455/54.1, 54.2, 455/561, 33.2, 33.3, 33.4, 33.1; 379/58, 59, 60, 61

[56] References Cited

U.S. PATENT DOCUMENTS

| | | | |
|---|---|---|---|
| 4,475,010 | 10/1984 | Huensch et al. | 379/60 |
| 4,613,990 | 9/1986 | Halpern | 455/54.1 X |
| 4,765,753 | 8/1988 | Schmidt | 370/94.1 |
| 4,811,421 | 3/1989 | Havel et al. | 379/58 X |
| 4,821,310 | 4/1989 | Lynk, Jr. et al. | 455/54.2 X |
| 5,309,503 | 5/1994 | Bruckert et al. | 455/33.4 X |

FOREIGN PATENT DOCUMENTS

| | | |
|---|---|---|
| 0335846 | 10/1989 | European Pat. Off. . |
| 0347396 | 12/1989 | European Pat. Off. . |
| WO88/08650 | 11/1988 | WIPO . |

*Primary Examiner*—Reinhard J. Eisenzopf
*Assistant Examiner*—Philip J. Sobutka
*Attorney, Agent, or Firm*—Burns, Doane, Swecker & Mathis

[57] ABSTRACT

The invention relates to methods for handling a bidirectional connection involving a mobile station in a cellular mobile radio communication system having adjacent cells of substantially different sizes, wherein the mobile station estimates the strength of radio signals received from base stations for cells of different sizes, the signal strength of radio signals received from the mobile station by base stations for cells of different sizes are estimated, decisions on which base station(s) should be responsible for an uplink channel of a bidirectional connection are based on uplink parameters including estimated strength for signals received at base stations, the signal strength at the base station(s) responsible for the uplink channel is used for controlling the output power of the mobile station, and decisions on which base station(s) should be responsible for the downlink channel of a bidirectional connection are based on downlink parameters including estimated strength of radio signals from base stations received at the mobile station.

15 Claims, 4 Drawing Sheets

METHODS IN A CELLULAR MOBILE RADIO COMMUNICATION SYSTEM

FIELD OF INVENTION

The present invention relates to mobile radio communication systems. More particularly the invention relates to methods in a cellular mobile radio system having cells of substantially different sizes or base stations transmitting with substantially different output power. The methods according to the invention include power control of mobile stations, selection of base station and handoff.

BACKGROUND OF THE INVENTION

Many mobile radio systems of various kinds are known and in use. One kind of systems are analogue FDMA systems. Abbreviated names of some well known FDMA systems are AMPS, NMT and TACS.

A type of systems different from analogue FDMA systems are digital FDMA systems. The pan European digital cellular system abbreviated GSM is a type of digital mobile radio communication system now in use in Europe. This system is specified in the document "Recommendation GSM" from ETSI/TC GSM, published by European Telecommunication Standardization Institute, ETSI B.P. 152-F-06561 Valbonne Cedex, France. For an exhaustive information on this system reference is given to the mentioned publication, the subject matter of which is incorporated herein as a reference.

One type of mobile radio communication system used in USA is specified in the document EIA/TIA, Cellular System, Dual-Mode Mobile station—Base Station Compatibility Standard, IS-54, published by ELECTRONIC INDUSTRIES ASSOCIATION, Engineering Department, 2001 Eye Street, N.W. Washington, D.C. 20006, USA. This system has both FDMA radio channels for radio signals with analog modulation and TDMA radio channels for radio signals with digital modulation. For an exhaustive information on this system reference is given to the mentioned publication, the subject matter of which is incorporated herein as a reference.

Both the system according to TIA IS-54 and the GSM system are TDMA systems with many radio channels disposing separate frequency bands. For a bidirectional connection with a mobile, a telephone call, one time slot of a radio channel is required for each direction of the connection. In the older analogue FDMA systems like AMPS, TACS and NMT one entire radio channel is required for each direction of each bidirectional connection with a mobile. An entire radio channel or a time slot of a radio channel, used by a base station for transmitting radio signals including speech or data pertaining to a connection to a mobile station, is sometimes called a forward channel of a connection. Sometimes it is called a downlink of a connection. An entire radio channel or a time slot of a radio channel, used by a mobile station for transmitting radio signals to a base station and including speech or data pertaining to a connection involving the mobile station, is sometimes called a reverse channel of a connection. Sometimes it is called an uplink of a connection. In addition to radio channels for information pertaining to connections already set up, e.g., speech of a telephone call or data of a data connection, most cellular mobile radio systems also have separate control channels for broadcasting system information, setting up calls, paging of mobiles or general information not pertaining to a particular connection already set up.

The radio frequency spectrum available to a mobile radio communication system limits the capacity of the system, the number of simultaneous connections the system can handle. In order to be able to use the same radio channel in FDMA systems, or in TDMA systems the same time slot of a radio channel, for more than one connection, mobile radio systems are made cellular systems. The geographical area to be covered by a system is then divided into smaller areas called cells and mobiles in a cell communicate with a base station for that cell. Cells are grouped together in clusters. Some or all of the available radio channels are distributed among the cells according to a frequency plan. The cell sizes will depend of the required traffic handling capacity. The higher required capacity the smaller cells.

Cell clusters and frequency plans enable plural use of radio channels in a FDMA system and plural use of time slots of radio channels in a FDMA system. Such plural use of radio channels and time slots is sometimes called channel re-use. The interference from other stations using the same radio channel or time slot is sometimes called co-channel interference. The co-channel interference sets an upper limit to the channel re-use. The co-channel interference depends, of course, on the output power of the radio signals transmitted. Thus, transmitting unnecessarily strong radio signals causes unnecessary co-channel interference and unnecessarily limits the capacity of a cellular FDMA or TDMA mobile radio communication system. Thus, appropriate control of transmitter output power is important, at least in high performance cellular FDMA and TDMA mobile radio systems.

There are other reasons for controlling the of power of radio signals transmitted in a cellular system. Power conservation is an important aspect of small light weight portable battery powered mobile stations. One way of saving battery power in a mobile station is to control the strength of transmitted radio signals in response to measured signal strength at the receiving base station. If the signal strength at the receiving base station is not be measured, a mobile must always transmit radio signals with a strength sufficient for a worst case condition, e.g., when the mobile station is located at the borderline of a cell. For most locations such a signal strength is unnecessarily high. If the strength of received signals is measured, a base station may send power control messages to the mobile permitting a reduction of the mobile transmit power whenever an excessive signal level is detected.

Another way of saving power and reducing interference is discontinuous transmission. In a normal telephone call, pauses in the speech are frequent and quite long in relation to a radio channel time slot. Transmitting radio signals when there is no information to forward is only a waste of power. Discontinuous transmission means the transmission is interrupted when there is a pause in the speech of a call or no information to be forwarded on an ongoing connection.

Another type of digital mobile radio communication systems somewhat different from the above described FDMA and TDMA systems is the broadband code division multiple access type systems, abbreviated CDMA. In normal broadband CDMA systems, all the radio signal transmissions relating to different connections involving the mobile stations are not separated in time slots or in different narrow band radio channels. Also in a normal broadband CDMA system there is no fixed frequency plan. Instead base and mobile stations both in the same cell and in surrounding cells may deliberately transmit radio signals relating to various connections simultaneously on the same wideband radio channel. As a consequence, the co-channel interference in a CDMA system will be very high in relation to such interference in the previously described TDMA systems. More precisely the interference level in CDMA systems will normally be several times as high as the level of the desired radio signal relating to the connection.

The reason why a CDMA system can cope with this high level of co-channel interference is the wide bandwidth of each radio channel used. A wideband radio channel in CDMA will normally have a bandwidth equivalent to several of the narrow bandwidth radio channels used in TDMA or FDMA systems. The wide bandwidth allows for a high degree of channel coding. Such coding makes it possible for the mobile and base station receivers to recognize the desired signal from all other signals even though the interference level exceeds the level of the desired signal.

A feature of the CDMA systems is that the number of connections permitted within a frequency band is not limited by the number of time slots/radio channels. Instead the call handling capacity is limited by the maximum level of co-channel interference still permitting the mobile and base station receivers to detect their desired signals.

In a CDMA system, power control and discontinuous transmission reduces the average total power of interfering signals. Thus, discontinuous transmission means reduces co-channel interference and increases capacity in a CDMA system, since the capacity generally depends on the average interference level.

One reason for using CDMA, as opposed to FDMA and TDMA, is that CDMA is alleged to enhance the spectrum efficiency. In all calculations of the spectrum efficiency, i.e., number of connections per cell for a certain bandwidth, all cells have been equally sized.

In a CDMA system, it is very important that the received signal strength from all users on the same wideband channel is equalized. Otherwise an unnecessarily high signal would reduce the capacity since the processing gain of the coding can suppress only a certain amount of interference.

In the reverse channel from mobile to base, the transmit powers of the mobiles should be controlled in order to equalize the received signal strengths at the base station and avoid mobiles close to the base using unnecessarily high powers that would cause unnecessary interference with the signals from the mobiles at the edge of the cell.

In the forward channel from base to mobile, the transmit power distribution over the mobile flock should be tailored according to each mobile's distance from its cell edge. The power of signals transmitted to mobiles close to the cell edge should be increased to compensate for the higher interference level received by that mobile from neighboring base stations.

This technique, known as Dynamic Power Control, is essential for the performance of a CDMA system. The technique works well if all cells are of equal size and all base stations transmit radio signals with the same total output power. A mobile station at the border between two adjacent cells will then receive radio signals of equal power from its own base station and from the neighbor base station. Similarly the two base stations for adjacent cells will receive signals of the same power from a mobile station at the border, and due to the dynamic power control that power will be equal to the power received from the other mobile stations in the cell.

However, a different situation will arise if two adjacent cells are of substantially different sizes. Cells of different sizes may be adjacent at the border between a high traffic area and a low traffic area. It can also occur when a so called "umbrella cell" gives general coverage to an area where smaller "microcells" gives high traffic capacity to certain areas.

In a prior art CDMA system, the output power of the base station in a larger cell would be higher than that of a smaller cell so that a mobile at the cell border would receive signals of equal strength from the two base stations. This would not cause special problems since it is the same situation as for cells of equal size.

However, a mobile at the border between a larger cell and a smaller cell transmitting radio signals to a base station for the larger cell would have to transmit radio signals of higher strength than a mobile at the same cell border transmitting radio signals to a base station for the smaller cell, in order for the strength of signals received at the intended receiving base stations to be the same. The mobile transmitting to the base of a larger cell would thereby cause unacceptable interference to the base of the smaller cell and reduce its capacity.

Alternatively, any mobile station at the cell border could transmit radio signals of the same power, required for the largest cell, independent of the size of the cell the mobile transmits to. The power of signals received at the base station would then be unnecessarily high in small cells. Since the signals received by a base station from all mobile stations in a cell should be equally strong, all mobile stations in the smaller cell would have to increase the output power correspondingly. This would lead to higher power consumption in the mobile stations and higher total interference levels.

Although the problem of power control and co-channel interference when adjacent or neighbor cells have different sizes may be more pertinent to CDMA systems, it is also a problem in FDMA and TDMA systems. In summary, prior art methods of communication and power control may cause problems when a cellular mobile radio system comprises adjacent cells of substantially different sizes. The present invention aims at solving these problems.

SUMMARY OF THE DISCLOSURE

The invention aims at solving various problems encountered in cellular mobile radio systems having cells of substantially different sizes or base stations transmitting with substantially different output power.

One object of the present invention is to provide convenient methods for selection of a base station for receiving radio signals from a mobile station and control of mobile station output power in a cellular mobile radio system with cells of substantially different size.

Another object of the present invention is to provide convenient methods for selection of a cell or base station responsible for transmitting radio signals to a mobile station in a cellular mobile radio communication system having cells of substantially different size.

Still another object of the present invention is to provide convenient methods for reducing unnecessary co-channel interference from mobile stations in a cellular mobile radio system where the areas served by different base stations have substantially different sizes.

Yet another object of the present invention is to provide convenient methods for communication in a cellular mobile radio system with cell plans including adjacent cells of substantially different size.

Expressed somewhat simplified and in brief, the present invention is based on an idea to solve the problem with communication in adjacent cells of different sizes by letting a mobile station in some part of the border area receive information on a downlink or forward channel from one base station and transmit information on an uplink or reverse channel to a different base station.

According to one aspect of the present invention, decisions on which base station to use for the downlink of a bidirectional connection with a mobile station are made more or less independently of which base station is used for the uplink of the connection. According to a preferred embodiment, decisions on which base station to be used for the downlink of a bidirectional connection involving a mobile station are based on downlink parameters including measurements of strength of radio signals from base stations received at the mobile station.

According to a similar aspect of the present invention, decisions on which base station to use for the uplink of a bidirectional connection with a mobile station are made more or less independently of which base station is used for the downlink of the connection. According to a preferred embodiment, decisions on which base station to be used for the uplink of a bidirectional connection involving a mobile station are based on uplink parameters including measurements of strength of radio signals from the mobile station received at base stations.

According to still another embodiment of the invention, a plurality of base stations measure strength of radio signals received from the mobile station. When one base station receives signals substantially stronger than the others, the highest signal strength is used for controlling the output power of the mobile station. According to a preferred embodiment, power control commands are transmitted from the base station responsible for the downlink even when the strength of signals received at a different base station is used for mobile station output power control.

Further aspects and embodiments of the invention will become apparent to those skilled in the art after reading the detailed description of drawings and embodiments.

Methods according to the invention may be implemented in various types of mobile radio communication systems including CDMA systems, FDMA systems and TDMA systems.

DETAILED DESCRIPTION OF DRAWINGS AND EMBODIMENTS

Figure 1:
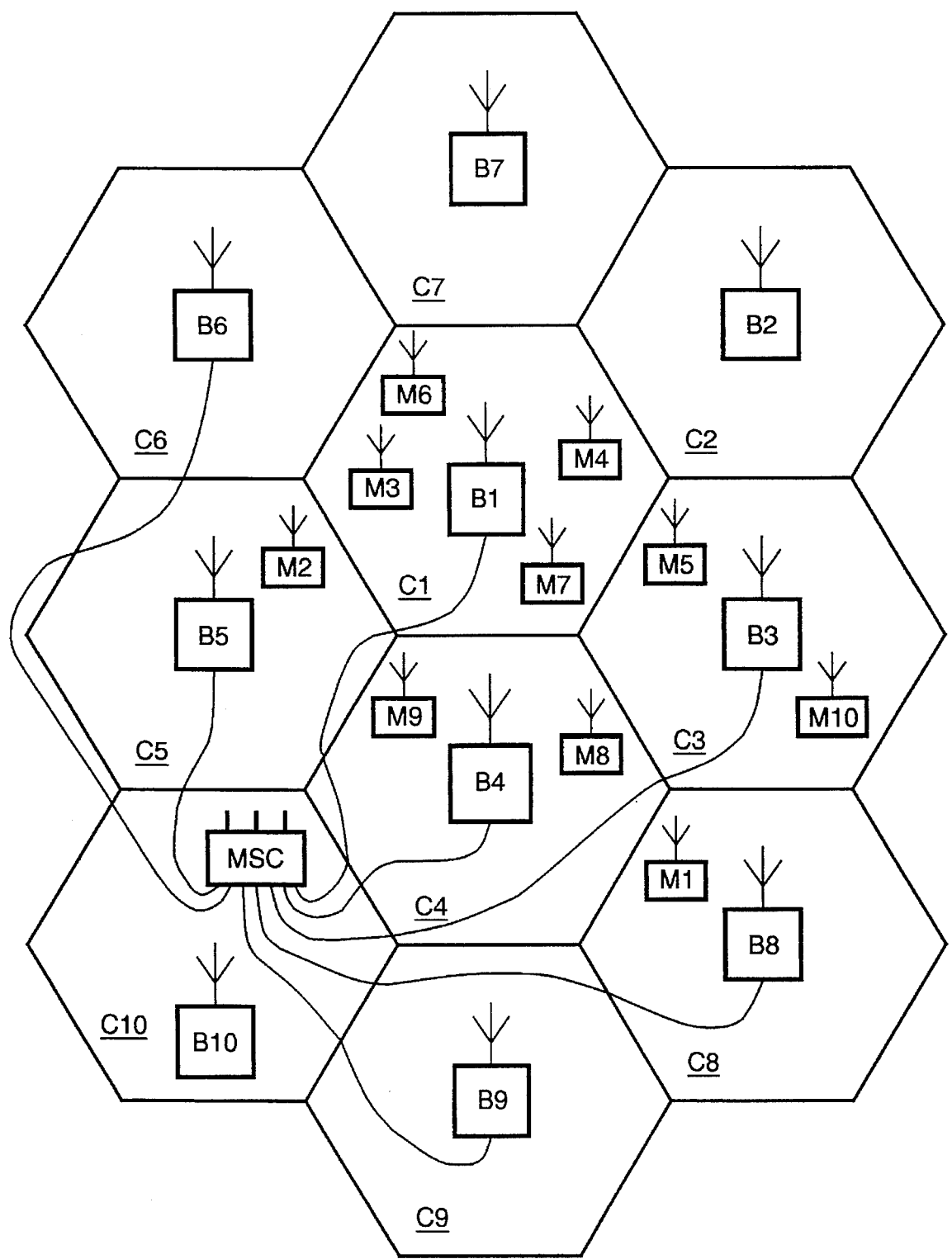
FIG. 1 illustrates a mobile radio communication system with cells of substantially equal size.

FIG. 1 illustrates ten cells, C1 to C10, of a cellular mobile radio system. For each cell there is a corresponding base station, B1 to B10. The base stations are situated in the center of the cells and have omnidirectional antennas. Mobile stations, M1 to M10, are also shown. They may be small light-weight battery powered portable stations or more bulky, vehicle installed stations, powered by the vehicles electric power system. The mobile stations may be moved within a cell and from one cell to another. A mobile switching center, MSC, is connected to all the base stations by cables or any other fixed means, like a radio link. Some of these cables or means are omitted in the figure for simplicity. The MSC is also connected by cables or links to a fixed public telephone network or a similar fixed communication network.

During operation the mobile stations will be in contact with the fixed part of the system by transmission of radio signals to and reception of radio signals from the different base stations. Telephone calls, data communication links or other communication paths may be set up between one mobile station and another mobile station in the system. Calls may also be set up to mobiles in an other mobile radio system or to subscribers in the fixed network. For the purpose of this application such telephone calls and data communication links are all called connections irrespective if they originate in a mobile station or end in a mobile station.

FIG. 1 does not illustrate a complete normal mobile radio communication system but only part of a a mobile radio communication system. Normally such a system will comprise more cells and base stations than the illustrated ten. Also the number of mobile stations will normally be much larger. Some cells of a cellular system may be served by more than one base station. A complete cellular mobile radio communication system may also include more MSCs with connected base stations and the mobile stations are usually free to communicate also via these. In some systems the base stations are not connected directly to a MSC but only to a base station controller BSC. A plurality of base stations are connected to one BSC. A plurality of BSCs are connected to a MSC.

In FIG. 1 all cells have the same hexagonal shape and the same size. Cells surrounded by other cells therefore have six adjacent cells, e.g., cell C1 has adjacent cells C2–C7. In practice cells may have a different shape than hexagonal. Cells surrounded by other cells may then have more or less than six adjacent cells.

A complete cellular system may also have some larger umbrella cells each covering an area also covered by a group of smaller cells. Base stations located in the vicinity of the cell borders and with sector antennas are also common.

Figure 2:
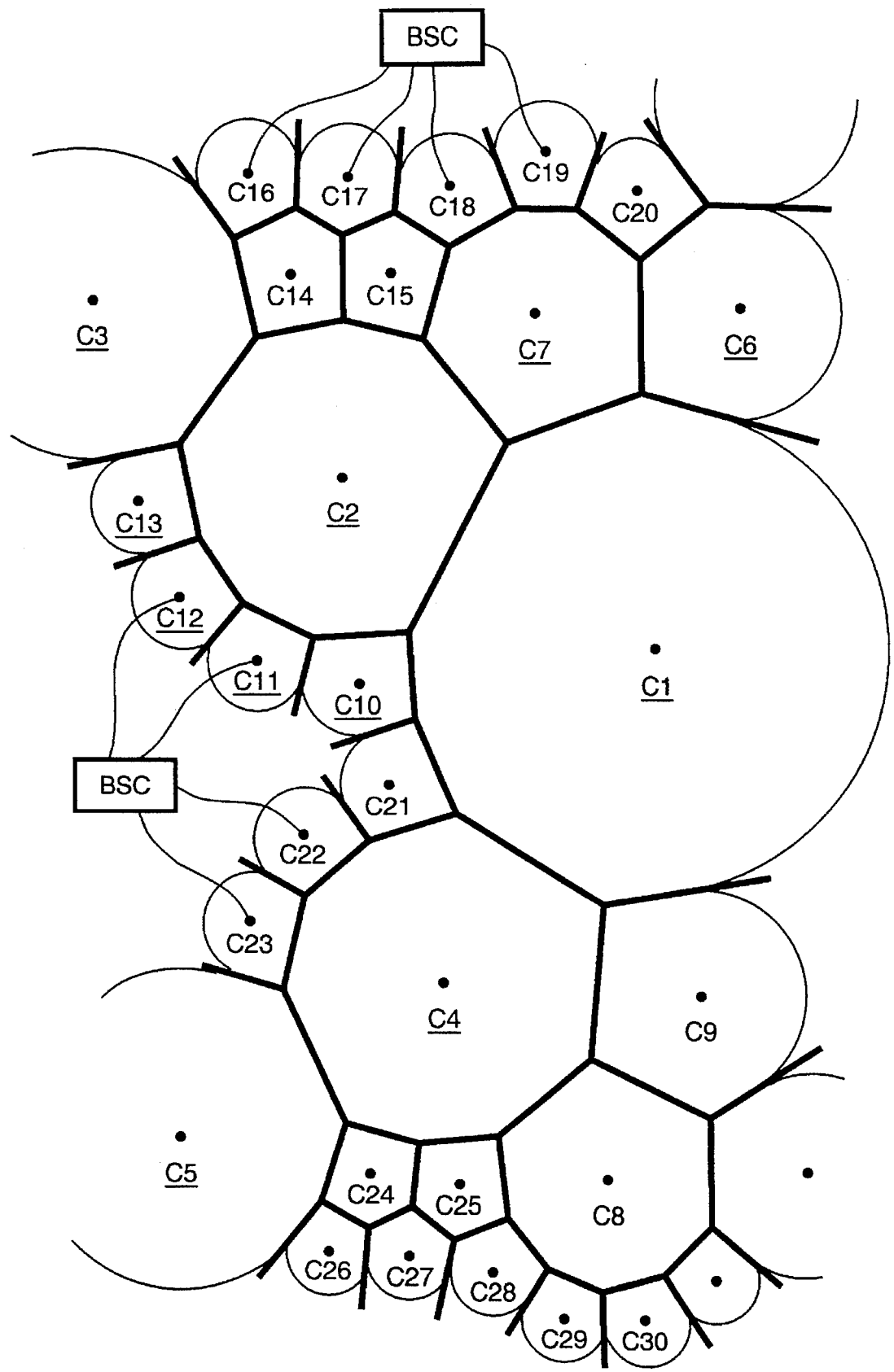
FIG. 2 illustrates adjacent cells of substantially different sizes in a cellular mobile radio communication system.

FIG. 2 illustrates some cells and base stations of a cellular mobile radio system having cells of substantially different size. The largest cell in FIG. 2 is cell C1. The second largest cells are C2, C3, C4 and C5. Cells C6, C7, C8 and C9 are similar in size and slighly smaller than cells C2–C5. A plurality of small cells C10 to C30 have about the same shape and size and are the smallest cells illustrated.

For each cell in FIG. 2 there is a base station indicated by a dot in the cell center. The base station for any cell has the same reference number as the cell, but for reasons of space no base station reference numbers are indicated in FIG. 2. However, the base station for cell C1 is B1, the base stations for cells C2–C5 are B2–B5 respectively, the base stations for cells C6–C10 are B6–B10, etc.

If the cells illustrated in FIG. 2 belonged to a FDMA system or a TDMA system, there would be a plurality of communication radio channels for transmission of radio signals comprising information pertaining to connections. Depending on the kind of connection such information could be speech information or data. If the cells illustrated in FIG. 2 belonged to a CDMA system, there would be at least one forward wideband communication radio channel and at least one reverse wideband communication radio channel for transmission of radio signals including information pertaining to connections. More wideband channels would be possible.

For transmitting radio signals to a mobile station anywhere in a particular cell the base station for that particular cell must be able to transmit radio signals having sufficient strength when received by mobile stations located in the outskirts of that particular cell. Since the cells in FIG. 2 have substantially different sizes it is not necessary for a base station for a small cell, e.g., base station B10 for cell C10, to be capable of transmitting as strong radio signals as a base station for a big cell, e.g., base station B1 for cell C1. Of course it would be possible to have base stations with the same maximum output power for all the cells. However in order to avoid or reduce unnecessary interference the base stations for smaller cells will normally never transmit radio signals stronger than necessary for communication with mobile stations within the cell.

When there are plural mobile stations involved in connections in the same cell, the base station for the cell might transmit on a communication channel radio signals pertaining to a any connection with the same output power to any mobile station independently of the location of the mobile in cell. However, it is normally preferred to consider the path loss to a mobile involved in a connection and not transmit on a communication channel with more power than necessary for sufficient reception at the mobile station.

In addition to communication channels, a system with the cells illustrated in FIG. 2 would have at least one forward control channel for each cell. A forward control channel is used for broadcasting system information, paging of mobile stations, setting up of connections and other general information not unique to one connection.

A forward control channel is normally used by a base station for transmission to more than one mobile station simultaneously. Sometimes a forward control channel is used for transmission to mobile stations in the cell with unknown locations in the cell and therefore unknown path loss. In order to enable any mobile station in a cell to receive signals on a forward control channel with sufficient strength, the output power of radio signals transmitted on a control channel from a base station for a cell is therefore normally adapted to the size of the cell. In a mobile system according to FIG. 2 a base station for cell C1 would therefore transmit the strongest control channel radio signals, the base stations for cells C2–C5 would transmit the second strongest control channel radio signals, the base stations for cells C6–C9 would transmit control channel signals slightly weaker, and the base stations for cells C10–C30 would transmit the weakest signals on their control channels.

In some kinds of systems there are other kinds of control channels transmitting with a power independent upon the location of any mobile in the cell. One type of such control channel are pilot channels transmitting phase and frequency reference signals enabling frequency control and timing of mobiles.

Figure 3:
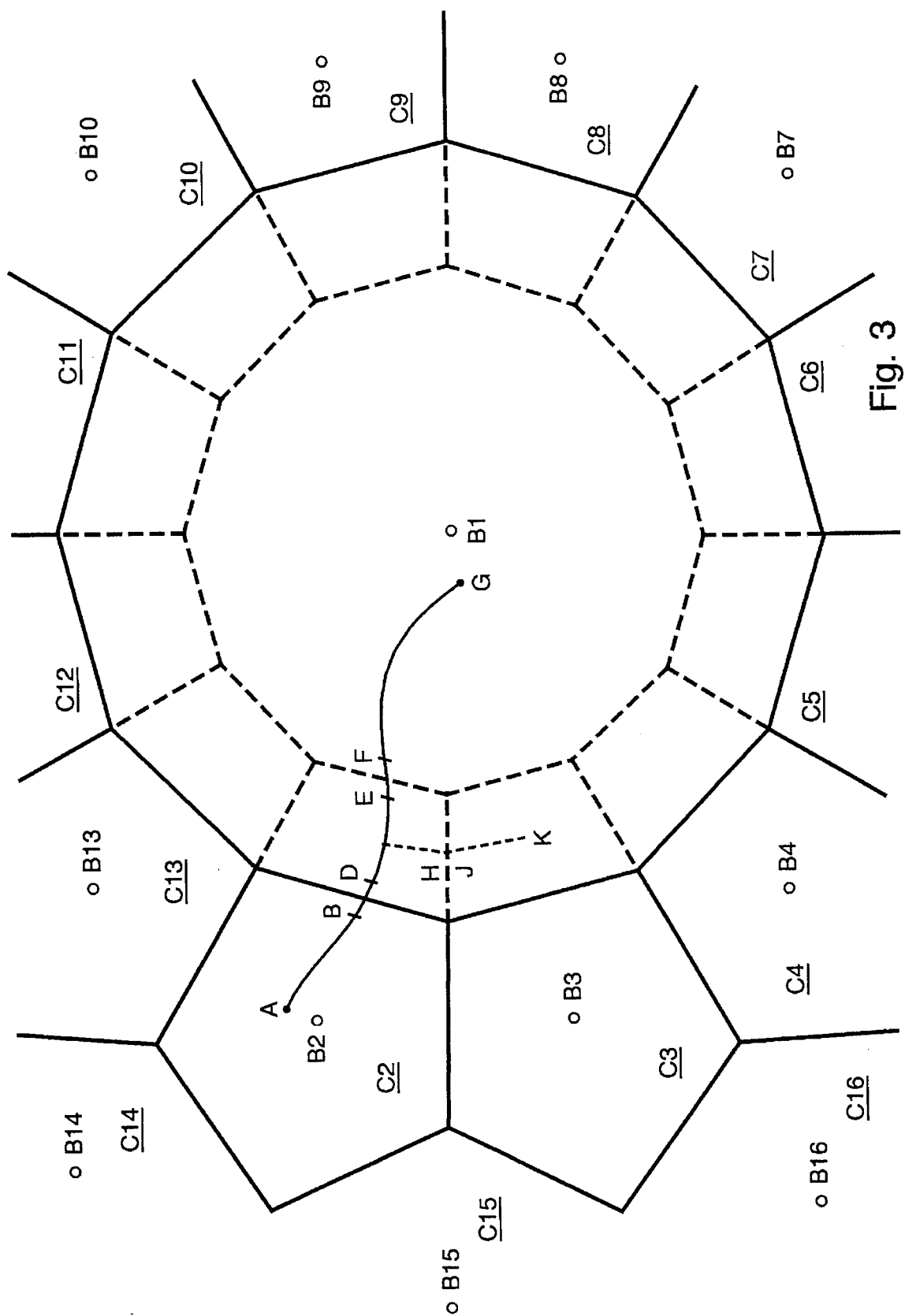
FIG. 3 illustrates some cells in a mobile radio system and two paths of a mobile station moving between cells.

FIG. 3 illustrates one giant cell C1 surrounded by a plurality of small cells C2–C13. Parts of another three cells C14, C15 and C16 are also illustrated. Base station B1 for cell C1 transmits control channel radio signals with a much higher output power than the output power control radio channel signals transmitted by any other base station for a cell C2–C16. The cell border lines between adjacent cells are illustrated as straight lines in FIG. 3. At a cell border line between two adjacent cells the signal strength of control radio signals transmitted from one base station for one cell is equally as strong as the signal strength of control radio signals transmitted from the base station for the other cell.

Illustrated with fractional lines in FIG. 3 is also a different kind of border lines between adjacent cells. If a mobile station would transmit radio signals from an omnidirectional antenna at a location on a fractional line in FIG. 3, the strength of the signals when received at the base station for the cell on one side of the line would be equally as strong as the signal strength of the signals when received by the base station for the cell on the other side of the line. Another way of expressing substantially the same thing would be to say that on a fractional line between two adjacent cells, the path loss to the base stations for the cells are equal. The fractional lines may therefore be called path loss border lines.

Since the cells C2–C13 in FIG. 3 have the same size, their base stations normally transmit radio signals on their control channels with the same output power. The cell border lines and most of the path loss border lines between any adjacent pair of the cells C2–C13 will therefore coincide. However, cell C1 is much greater than any of the cells C2–C13 and the output power of control channel radio signals from base station B1 is much stronger than the output power of control channel signals from any of the base stations B2–B13. The path loss border lines between cell C1 any any of cells C2–C13 do therefore not coincide with the cell borders between cell C1 and the cells C2–13. For this reason also part of the path loss border lines between any two adjacent cells C2–C13 are visible inside cell C1.

The straight cell border lines and the straight path loss border lines of FIGS. 1–3 are only achieved under ideal conditions where propagation loss is a function of the distance only. In a real system, radio signal shadowing and fading causes deviation from straight border line patterns, but for the purpose of explaining the invention this may be disregarded in this disclosure.

According to the present invention more than one base station may sometimes be used simultaneously for a bidirectional connection involving a mobile station. According to the invention this would normally be the case for a mobile station well within the area between the path loss border lines and the cell borders of adjacent cells of different sizes. Sometimes it would also be true for a mobile station at the border lines or outside the border line area but close to a border line.

According to some embodiments of methods according to the invention the MSC makes decisions on which base station shall be responsible for transmission of radio signals comprising information pertaining to the connection to a mobile. This may be called forward channel or downlink handoff decisions or control. The MSC also makes decisions on which base station shall be responsible for receiving the radio signals comprising information pertaining to the connection transmitted by a mobile, and consequently which base station shall be responsible for forwarding to the MSC the information pertaining to the connection. This may be called uplink or reverse channel handoff decisions or control.

The MSC monitors the uplink and compares uplink parameters with desired uplink parameter values or thresholds. The MSC also monitors downlink parameters with desired downlink parameter values of thresholds. When uplink handoff between a larger cell and a smaller cell is desirable in view of uplink parameter values, the MSC tries to perform uplink handoff between a smaller and a larger cell independently of downlink handoff. When downlink handoff between a smaller cell and a larger cell is desirable in view of downlink parameter values, the MSC tries to perform downlink handoff between a larger cell and a smaller cell independently of uplink handoff.

The MSC makes handoff decisions based on parameters including estimated signal strength. Normally other parameters and circumstances also considered by the MSC when making decisions to handoff or not to handoff. One obvious matter to consider is of course whether an intended base station is capable of communication with a mobile station in view of interference and its communication with other mobile stations. For the purpose of explaining some embodiments of the present invention and making it easier to understand the present invention, it will first be assumed that interference and communication with other mobile stations do not prevent decisions on responsibility and handoff based solely on estimated signal strength. However, it should be understood that this is a simplification and the performance of a system will sometimes be poor if interference and communication with other mobile stations is neglected in connection with handoff decisions and control.

For the purpose of downlink handoff control the MSC orders base stations responsible for the downlink to transmit downlink signal strength measuring orders to mobile stations. Such a measuring order includes information on which base station control channels the strength of signals should be measured. Normally the control channels to be measured are the control channels of the base station responsible for the downlink to the mobile and the base stations for the cells adjacent to the cell of the downlink base station.

The mobile station measures the strength of radio signals on the base station control channels indicated and reports estimated signal strength to the base station responsible for the uplink. This base station forwards information from mobile stations on signal strength to the MSC. If the strength of control channel radio signals from any base station are reported to be sufficiently strong in relation to the signal strength of the base station responsible for the downlink and the other base stations, the MSC may consider handoff. However, in order to avoid unnecessarily frequent handoffs when a mobile station moves along a cell border, MSC does not initiate handoff until the strength of control signals from the a base station is substantially stronger than the strength of control signals from the base station responsible for the downlink and also at least as strong as the signals from the other base stations. As soon as the signal strength from a base station exceeds the strength of the responsible base station with a downlink handoff margin, the MSC initiates handoff of the downlink. The MSC then tries to allocate a free downlink at the base station whose signals are received strongest at the mobile station. If the MSC finds a free downlink it decides to handoff the downlink from the responsible base station to the base station with the strongest signals. The MSC then orders the responsible base station to transmit a downlink handoff command to the mobile station.

For the purpose of uplink handoff control, the MSC sends uplink signal strength measuring orders to base stations, ordering them to measure the strength of received signals transmitted by mobile stations and to report estimated signal strengths to the MSC. Such uplink measuring orders include information on which mobile station signals the strength should be measured and reported. Normally, the base station responsible for the uplink to a mobile and the base stations for cells adjacent to the cell of the uplink responsible base station are ordered to measure strength of signals received from that mobile.

The base stations measure the strength of radio signals from the mobiles and report estimated signal strengths to the MSC. If the strength of signals measured by any base station, other than the base station responsible for the uplink, are reported to be sufficiently strong in relation to the signal strength reported by the base station responsible for the uplnink, the MSC may consider an uplink handoff. However, in order to avoid unnecessarily frequent handoffs when a mobile station moves along a path loss border, the MSC does not initiate handoff until the strength of signals received by a base station is substantially stronger then the strength of signals received by the base station responsible for the uplink. As soon as the signal strength estimated by a base station exceeds the strength estimated by the responsible base station with an uplink handoff margin, the MSC initiates handoff of the uplink. The MSC then tries to allocate a free uplink at the base station receiving the strongest signals from the mobile station. If the MSC finds a free uplink it decides to handoff the uplink from the responsible base station to the base station receiving the strongest signals. The MSC then informs the base station receiving the strongest signals about the decided uplink handoff. The MSC also orders the responsible base station to transmit an uplink handoff command to the mobile station.

Those skilled in the art know that an appropriate handoff format and the appropriate information in a handoff command depend on the kind of mobile radio system, e.g., whether the system is a FDMA or a TDMA or CDMA system. The present invention may be implemented in various kinds of cellular mobile radio communication systems. Information on handoff commands and their formats for various systems may be found in the system specifications. For the purpose of understanding this invention it is sufficient to know the handoff command transmitted by the responsible base station identifies the new base station to be responsible for the downlink or uplink and also identifies the downlink or uplink to be used for the connection after handoff. In a FDMA system the uplink or downlink will be a radio channel, in a TDMA system a time slot of a radio channel, and in a CDMA system a code and possibly also a wideband channel.

The MSC is also responsible for control of mobile station radio signal output power. According to one preferred embodiment there is one or more desired signal strength values or a signal strength target value. The MSC compares the estimated strength of radio signals from a mobile station received by the base station responsible for the uplink with at least one desired signal strength or target value. In response to the result of the comparison the MSC may order the base station responsible for the downlink to send either a power increase command or a power reduce command to the mobile station. Upon receiving such commands the mobile station adjusts its output power, if possible.

For the purpose of explaining some embodiments of the present invention it will now be assumed a mobile station Mx starts at location A in cell C2 of FIG. 3, moves to B in cell C2 and to D in cell C1, continues to E and F in C1 along the path indicated in FIG. 3, and arrives in the indicated location G in Cl of FIG. 3. It will also be assumed the mobile station thereafter moves back along the same path from location G in C1 to location A in C2. When returning along the path the mobile station passes the locations F, E, D and B.

Procedures for setting up connections in mobile radio systems are well known to those skilled in the art. The setting up of connections does not constitute an element of the present invention. It is therefore assumed that a bidirectional connection involving the mobile station Mx has already been set up when the mobile station Mx is at location A. The base station B2 is responsible for the communication with Mx and transmits radio signals including information pertaining to the connection to the mobile station Mx.

At the location A, the mobile station Mx receives the radio signals transmitted by the mobile station B2 and estimates the strength. The mobile station Mx also estimates the signal strength of radio signals transmitted by one or more other base stations determined by the MSC. At the location A those base stations would normally be the base stations for all cells adjacent to cell C2, which are B1, B3, B15, B14 and B13. Since A is located very close to base station B2 but remote from all other base stations, the strength of radio signals from base station B2 is much stronger when received by Mx than the radio signals from any other base station that the mobile station Mx may receive, e.g., the radio signals received from B1, B3, B15, B14 and B13 are much weaker than the radio signals from B2.

The mobile station Mx transmits radio signals including information pertaining to the connection. The radio signals transmitted by the mobile station Mx also comprise information on estimated signal strength for radio signals from base stations.

The radio signals transmitted by Mx are received by the base station B2. The base station B2 measures the strength of the received radio signals transmitted by Mx. The information pertaining to the connection and the information on estimated signal strength is forwarded by the base station B2 to the MSC. B2 also estimates the signal strength of radio signals transmitted by other mobile stations determined by the mobile switching center MSC. B2 forwards to the MSC information on estimated signal strength of radio signals from mobile stations.

The estimated strength of radio signals transmitted by Mx and received by B2 is used by the MSC for control of the output power of the radio signals transmitted by Mx. The MSC compares the estimated strength with at least one desired or threshold value. Depending upon the result of the comparison, the MSC orders B2 to include a power change command in the radio signals transmitted by B2 to Mx. In this way the strength of the radio signals transmitted by Mx may be increased or decreased to more or less counteract the path loss. Thus, if desired the strength of the radio signals from Mx may be substantially the same when arriving at B2 almost independently of the location of Mx in C2.

When Mx is at the location A it is therefore assumed the MSC has ordered B1–B3 and B13–B15 to estimate the strength of radio signals transmitted by Mx. When Mx is at A, B2 receives much stronger radio signals from Mx than any of the other base stations. Furthermore Mx receives much stronger radio signals from B2 than from any other base station. B2 is responsible for transmitting information pertaining to the connection to Mx. This may also be expressed as B2 being responsible for the downlink or forward channel to Mx. Furthermore at A, B2 is also responsible for receiving and forwarding to the MSC information from Mx pertaining to the connection. This may also be expressed as B2 being responsible for the uplink or reverse channel from Mx. In view of the estimated strength of signals reported to the MSC there is no reason for changing the responsibility for the uplink channel. Neither is there any reason for changing the responsibility for the downlink channel. Accordingly, the MSC makes no decision to change the responsibility or to initiate handoff when Mx is at location A. Since A is very close to B2 the output power of the radio signals transmitted by Mx is comparatively very low.

As Mx moves along the indicated path from A to B the strength of radio signals from B2, B13, B14 and B15 are decreasing, the strength of radio signals from B3 are almost unchanged but the strength of radio signals from B1 is increasing. However, the estimated strength of radio signals transmitted by B2 is substantially stronger than the estimated strength of radio signals from B1, B3, B13, B14 and B15 along the path from A to B.

As Mx moves along the indicated path from A to B its distance to B2 increases. If Mx continued to transmit with the same output power all the time it moved along the path from A to B, the strength of the radio signals from Mx received by B2 would decrease. However, a power control function is performed by the MSC. As Mx moves from A to B along the path, MSC will order B2 to transmit power increase commands with the radio signals to Mx in order to make Mx increase the output power of transmitted radio signals. In this way the strength of the radio signals transmitted by Mx may be increased to compensate for the increased propagation loss as MS moves away from B2. Due to the power control the strength of the radio signals from Mx when arriving at B2 is more or less the same as Mx moves along the path from A to B.

As Mx moves along the path from A to B the strength of the radio signals from Mx when arriving at B1 is increasing. There are two reasons for the increase. A first reason is that the distance from Mx to B1 decreases as Mx moves along the path from A to B. A second reason is that the strength of the radio signals transmitted by Mx is increased by the power control performed by B2 and MSC. However, when Mx arrives at location B the estimated strength of the radio signals from Mx is much smaller when received by B1 and any other base station than when received by B2. In view of the signal strength estimated by Mx and B1 and B2 and other base stations reported to MSC, there is no need for any handoff and the MSC makes no decision to change the responsibility by initiating any handoff. Consequently B2 continues to be responsible for both uplink and downlink channel as Mx moves along the path from A to B.

As Mx moves from B to D it passes the indicated cell border where the signals from BS2 received by Mx will be equally as strong as the signals from BS1 received by Mx. When Mx arrives at D the estimated strength of radio signals from B1 will be substantially stronger than the estimated strength of radio signals from B2 and any other base station and the difference in estimated signal strength exceeds a downlink handoff margin. This is detected by the MSC when analyzing the measurement reports and MSC initiates downlink handoff. The MSC tries to allocate a free downlink channel in cell C1. If a free downlink channel is found, the MSC decides to handoff the downlink channel from B2 to B1 and instructs B2 to include a handoff command in its signals transmitted to Mx.

After the downlink handoff at D, B1 is now responsible for the downlink channel of the connection involving Mx. The responsibility for the uplink channel of the connection has not yet been handed off. Thus, B2 is still responsible for the uplink channel. It should be noted that in this situation one base station is responsible for one direction of a bidirectional connection, i.e., the downlink channel, but a different base station is responsible for the other direction of the same connection, i.e., the uplink channel.

For handoff control of the downlink channel, Mx continues to measure the received signal strength from B1 and other base stations determined by the MSC, normally the base stations of all cells adjacent to C1, which are B2–B13. Mx also continues to report the measured values to the MSC in its signals transmitted to B2. For handoff control of the uplink, B2 and other base stations determined by the MSC, normally all base stations for cells adjacent to cell C2, measures the received signal strength from Mx and report it to MSC. Since at location D, B2 receives substantially stronger signals from Mx than any of B1, B3, B13, B14, B15 does, no action is taken regarding the uplink channel.

As Mx moves along the indicated path from D to E, B2 continues to be responsible for the uplink channel. The MSC performs the power control function which will increase the Mx output power to compensate for the increased propagation loss as Mx moves away from B2. However, the MSC now orders B1 to send the power control messages to Mx, since B1 is responsible for the downlink channel of the connection and transmits radio signals comprising information pertaining to the connection to Mx.

As Mx moves along the path from E to F, it passes the path loss border where the signals from Mx received by B1 will be equally as strong as the signals from Mx received by B2. The signals received by other base stations, e.g. B3 and B13, are much weaker. When Mx arrives at F the estimated strength of radio signals from Mx received by B1 will be substantially stronger than the estimated strength of radio signals from Mx received by B2 and any other base station and the difference in estimated signal strength exceeds an uplink handoff margin. This is detected by the MSC when analyzing the measurement reports. The MSC then initiates handoff and tries to allocate a free uplink in C1. If a free uplink is found MSC decides to handoff the responsibility for the uplink from B2 to B1 and sends an uplink handoff order instructing B1 to include an uplink handoff command in its signals transmitted to Mx. The uplink handoff margin may be the same as or different from the downlink handoff margin.

After this handoff of the uplink channel, B1 is now responsible for both the downlink and the uplink of the connection. For handoff control of the downlink, Mx continues to measure the total received signal strength from B1 and other base stations determined by the MSC, normally the base stations B2–B13, and reports the measured values to B1. For handoff control of the uplink B1 and other base stations determined by the MSC, normally all base stations for all cells adjacent to cell C1, continues to measure the received signal strength from Mx and report them to the MSC.

As Mx moves along the indicated path from F to G, B1 continues to be responsible for both the downlink and the uplink channel of the connection. The MSC performs the power control function. Since Mx is approaching B1, the strength of signals from Mx received by B1 would increase with the decreasing distance, if Mx continued to transmit with the same output power all the time along the path from F to G. This is normally not desired. Instead it is normally desired to receive signals from Mx with substantially the same strength irrespective if Mx is at F or G or somewhere along the path between F and G. In order to compensate for the decreased propagation loss as Mx moves towards B1, the MSC compares the estimated strength of the radio signals received by B1 from Mx with one or more desired or threshold values. In response to the result of the comparisons, the MSC orders B1 to include power reduction commands in its signals transmitted to Mx. Thus the output power of the radio signals transmitted by Mx is reduced as Mx moves along the path from F to G.

As Mx moves from F to G the strength of signals received by Mx from B1 continues to be stronger than the strength of radio signals received by Mx from B2 and any other base station. Furthermore the radio signals from Mx received by B1 continue to be stronger than the radio signals from Mx received by any other base station. Accordingly there is no need for any handoff and the MSC does not decide or initiate any handoff of the uplink or downlink channel as Mx moves along the path from F to G.

As Mx moves back along the path from G to F, B1 continues to be responsible for both the downlink and the uplink. The power control function is performed by MSC using B1 for commands. The commands will urge Mx to increase the output power to compensate for the increased propagation loss at Mx moves away from B1. The radio signals received by Mx from B1 continue to be substantially stronger than the radio signals received by Mx from B2 and any other base station. The radio signals received by B1 from Mx continue to be substantially stronger than the radio signals from Mx received by B2 or any other base station, so no handoff action is taken.

As Mx moves from F to E it passes the path loss border where the signals from Mx received by B1 are equally as strong as the signals from Mx received by B2. At the point where the path crosses the border, the signals from Mx received by any other base station other than B1 or B2, e.g. B3 and B13, are substantially weaker than the signals from Mx received by B1 or B2. After crossing the path loss border the signals from Mx received by B2 become stronger than the radio signals from Mx received by B1. When Mx arrives at E, the difference between the estimated signal strength at B2 exceeds the estimated strength at B1 with the uplink handoff margin. This is detected by the MSC when analyzing the measurement reports. The MSC then initiates handoff of the uplink channel from B1 to B2. The MSC tries to allocate a free uplink in B2 and sends an uplink handoff command to Mx via B1.

After uplink handoff at E, B2 now has the responsibility for the uplink channel of the connection between MSC and Mx. However, B1 is still responsible for the downlink channel of the connection. For handoff control of the downlink channel, Mx continues to measure the total received signal strength from B1 and all base stations for all cells adjacent to B1, and reports the measured values to MSC via BS1. For handoff control of the uplink channel, B2 and the base stations for all cells adjacent to C2 measure the received signal strength from Mx and report to MSC. Since at this location E, the signals received by Mx from B1 are substantially stronger than the radio signals received from all other base stations, e.g., B2 and B3 and B13, no handoff action is taken on the downlink channel of the connection.

As Mx moves from E to D along the illustrated path, B2 is responsible for the uplink channel of the connection. MSC performs the power control function which will decrease the Mx output power to compensate for the decreased propagation loss as Mx moves towards B2. The power control messages are now sent from to Mx via B1, since B1 is still responsible for the downlink of the connection.

As Mx moves along the path from D to B it passes the cell border where the received signals from B2 are equally as strong as the received signals from B1. After crossing the border the signals received by Mx from B2 becomes stronger than the signals received by Mx from B1. When Mx arrives at location B, the strength of the signals from B2 exceeds the strength of the signals from B1 and any other base station with the the downlink handoff margin. This is detected by MSC when analyzing the measurement reports. MSC then initiates handoff of the downlink channel of the connection from B1 to B2. The MSC allocates a free downlink channel in B2 and sends a handoff command to Mx via B1.

After handoff of the responsibility for the downlink channel at B, B2 is now responsible for both the downlink channel and the uplink channel of the connection involving Mx. For handoff control of the downlink channel, Mx measures the strength of radio signals received from B2 and the base stations for the cells adjacent to C2, and reports the measured values to BS2. As Mx moves from B to A, B2 continues to be responsible for both the uplink and the downlink of the connection. The power control function is performed by MSC. MSC will order B2 to send power decrease messages in order to decrease the Mx output power to compensate for the decreased propagation loss as Mx moves towards B2. The signals received by Mx from B2 continue to be stronger than those received from B1 or any other base station, so no handoff action is taken.

For the purpose of explaining a somewhat different communication and handoff situation it will now be assumed a mobile station Mx starts at location A in cell C2 and continues as previously described along the path to locations B and to D. However, after leaving location D the mobile station Mx does not follow the path all the way to E but follows the dotted path to H, J and stops at K. In brief, the following things will then happen.

At location H the strength of radio signals from Mx received by B3 is almost as strong as the strength of radio signals received by B2. The radio signals received by B1 are weaker than both the signals received by B2 and the signals received by B3. When Mx crosses the path loss border line between H and J the signals from Mx received by B2 and B3 are equally as strong and substantially stronger than the signals from Mx received by B1 and any other base station. After crossing the path loss border the signals received by B3 will become stronger than the signals received by B2 and substantially stronger than the signals received by B1. When arriving at J the strength of signals received by B3 exceeds the strength of signals received by B2 with the handoff margin. At J the strength of signals received by B3 exceeds the strength of signals received by B1 with more than the handoff margin. The MSC notifies this and orders a handoff of the uplink channel from B2 to B3 when Mx has arrived at J.

On the path from J to K the radio signals received by B3 continue to be substantially stronger than the radio signals received by B1 and B2 and any other base station. The MSC therefore takes no action to initiate any handoff of the uplink channel.

The radio signals received by Mx from B1 continue to be substantially stronger than the radio signals received by Mx from B2 and B3 and any other base station all the time Mx moves from D to K. The MSC notifies this and takes no action to initiate any handoff of the downlink channel as Mx moves from D to K.

Figure 4:
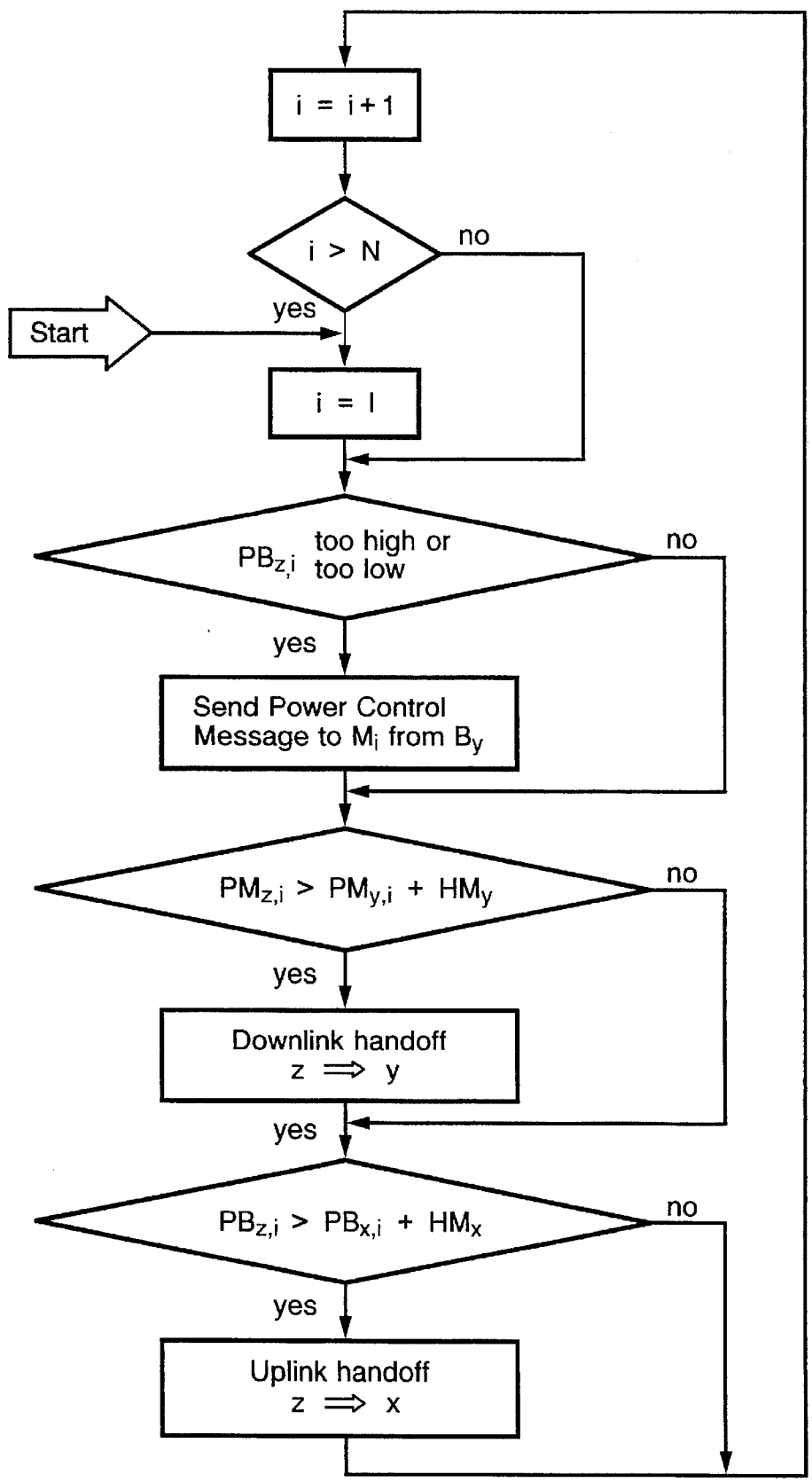
FIG. 4 illustrates a flow chart for monitoring base and mobile station communication.

A flow chart for the major operations of a MSC in relation to methods according to the present invention is illustrated in FIG. 4. MSC allocates individual index numbers to all mobile stations involved in a connection supervised by the MSC. The numbers begin with 1. When a connection is disconnected or ceases to be supervised by the MSC the index number is withdrawn from the mobile station. The mobile then having the highest number is given the withdrawn number instead of its previous number in order to eliminate unused numbers. MSC keep track of the highest number allocated to a mobile whose connection is supervised by the MSC.

The following abbreviations are used in the flow chart:
i = index number of mobile station
N = highest index number for any mobile station
M0 = mobile station with index i
x = index for base station responsible for uplink from $M_i$
y = index for base station responsible for downlink to $M_i$
z 32 index for any base station with highest signal strength
$B_x$ = base station with index x
$B_y$ = base station with index y
$B_z$ = base station with index z
$PB_{z,i}$ = maximum signal strength from $M_i$ at $B_z$
$PM_{z,i}$ = maximum signal strength from $B_z$ at $M_i$
$PB_{x,i}$ = received signal strength from $M_i$ at $B_x$
$PM_{y,i}$ = received signal strength from $B_y$ aft $M_i$
$HM_d$ = downlink handoff margin
$HM_u$ = uplink handoff margin In view of the previous disclosure of the operation of MSC for the purpose of handoff and power control and the previous disclosure of activities when Mx moves along the paths in FIG. 3, it is assumed that no further explanation of the flow chart is necessary.

In the embodiments described so far the MSC has been responsible for the power control. The comparisons between estimated signal strength and at least one desired value has been done in the MSC. Whenever there is a need for increasing or decreasing the output power of the mobile station, the MSC has ordered the base station responsible for the downlink or forward channel to transmit power increase or power decrease commands to the mobile station. Within the scope of the invention, it is possible to let a BSC or a base station responsible for the uplink or reverse channel to make comparisons and decide whether there is a need for increasing or decreasing the output power of the mobile station. When this base station is also responsible for the downlink or forward channel it may, on its own initiative, transmit power control commands to the mobile station. If another base station is responsible for the downlink or forward channel the base station responsible for the uplink channel may send to the BSC or MSC a request for transmission of mobile power control command transmission from the other base station. The MSC will then request the other base station to transmit such a command.

So far it has been assumed a desired handoff is not prevented by interference or for other reasons. If a desired uplink or downlink handoff to the base station with the highest strength is not possible, e.g., because there is no free uplink or downlink channel, the responsibility may be handed off to the base station with the second highest strength, if this strength is substantially stronger than that of the responsible base station. Alternatively no handoff is done if there is no free uplink or downlink at any base station with higher strength than the responsible base station.

In most cellular mobile radio communication systems, a base station that ceases to be responsible for the downlink immediately ceases to transmit radio signals comprising information pertaining to the connection. A base station that ceases to be responsible for the uplink immediately ceases to forward to its BSC or MSC information pertaining to the connection received from the mobile station. Embodiments of methods according to the invention may be implemented in such systems. However, for the purpose of avoiding misunderstandings, embodiments of the invention may also be implemented in mobile radio communication systems using base station transmitter diversity and handover methods according to the published European patent application Nos. 0335846 and 0347396. Thus, during downlink handoff and a limited time after downlink handoff both the old base station previously responsible for the downlink and the new base station subsequently responsible for the downlink may transmit to a mobile station radio signals comprising the same information pertaining to the connection involving the mobile. During uplink handoff and a limited time after uplink handoff both the old base station previously responsible for the uplink and the new base station subsequently responsible for the uplink may receive from a mobile station radio signals comprising the same information pertaining to a connection involving the mobile, and forward the same information to the BSC or MSC.

Under certain circumstances it might be preferable to implement in a method according to the present invention, transmitter diversity and/or receiver diversity among base stations even when there has not recently been any handoff. When implementing transmitter diversity both a base station responsible for the downlink and another base station transmit substantially the same information pertaining to the connection to the mobile station. According to one preferred embodiment, base station transmitter diversity is implemented when the strength of radio signals received by the mobile station from different base stations is substantially equally strong or the difference in strength does not exceed a particular transmitter diversity threshold.

When implementing receiver diversity both a base station responsible for the uplink and another base station receive the radio signals pertaining to the connection from the mobile station and forwards information therein to the appropriate BSC or MSC. According to one preferred embodiment base station receiver diversity is implemented when the strength of corresponding radio signals from a mobile station received by different base stations is substantially equally strong or the difference in strength does not exceed a particular receiver diversity threshold.

Selection of a base station responsible for the uplink of a bidirectional connection different from the base station responsible for the downlink of the connection has so far been described only at handoff. However, according to the invention independent selection of base station responsible for uplink of a bidirectional connection and selection of base station responsible for the downlink of the connection may also be performed at call set up. Thus a call set up procedure for a bidirectional connection according to the invention may end up in a communication where the base station responsible for the downlink of the connection is different from the base station responsible for the uplink of the connection. Embodiments of such call set up procedures will now be described assuming a mobile station located somewhere the path between locations D and E in FIG. 3 is involved in the connection as being either a calling party or a called party. The other party to the connection may also be a mobile station or a subscriber to a fixed switched network, e.g., a normal telephone or a data terminal connected to a PSTN.

Before any connection can take place the mobile station must select a base station from which it may receive possible page messages or control information. In idle mode a mobile station receives and measures the signal strength of radio signals transmitted by base stations on their control channels. The mobile station selects the base station control channel with the strongest radio signals. In this case, B1 is selected for receiving possible page messages or control information.

When receiving radio signals on control channels of the base station, the mobile station receives the information broadcasted on the control channels of base stations. Based on parameters included in this information as well as the measured signal strengths the mobile station then selects a base station to which it may transmit messages and information. The mobile station selects the base station which requires the lowest output power of radio signals from the mobile station. In this case B2 is selected.

If the broadcasted information indicates that base station B1 belongs to another location area other than the one where the mobile station is previously registered, the mobile station must make a new registration. The mobile station then transmits an access message to base station B2 on the control channel of B2, indicating that the mobile station is receiving the control channel from base station B1. This message is forwarded by the base station B2 to MSC. The MSC checks if there are any free traffic channels at base stations B1 and B2. The MSC may check base station B1 first and subsequently base station B2 or vice versa. If such traffic channels are available the MSC first allocates a downlink traffic channel at base station B1 and subsequently an uplink traffic channel at base station B2. Alternatively the MSC may first allocate an uplink traffic channel at base station B2 and subsequently a downlink traffic channel at base station B1. The allocation of downlink and uplink channels may also be made simultaneously by deciding upon a pair of traffic channels.

Using the allocated traffic channels for signaling, the actual registration will now be performed in accordance with the particular procedures of the mobile system with the exception that base station B1 is responsible for transmitting registration messages to the mobile station but base station B2 is responsible for receiving registration messages from the mobile station. The invention may be implemented in various known systems that they have more or less different registration procedures. Such procedures in known systems are known per se and do not constitute part of the present invention. It is obvious to one skilled in the art how the remaining registration steps should be adapted to the fact that different base stations are responsible for the uplink and the downlink. Accordingly there is no need to describe such registration procedures here. The mobile station is therefore now considered registered in the location area which includes base station B1.

In the first case to be described, the mobile station is the calling party. The process of setting up a connection starts when the subscriber of the mobile station dials the number of the called party and presses the "send" key on his mobile station. The mobile station then transmits an access message to the selected base station B2 on its control channel, indicating that a connection is required using B2 for the uplink and B1 for the downlink. The access message is forwarded by B2 to MSC. The MSC checks whether there are any free traffic channels at B1 and B2. The MSC may check B1 first and subsequently B2 or vice versa. If such traffic channels are available the MSC first allocates a downlink traffic channel at B1 and subsequently an uplink traffic channel at B2. Alternatively the MSC may first allocate an uplink traffic channel at B2 and subsequently a downlink traffic channel at B1. The allocation of downlink traffic channel and uplink traffic channel at MSC may also be made simultaneously by deciding upon a pair of traffic channels.

After traffic channel allocation the MSC orders B1 to transmit a channel allocation command to the mobile station on the control channel of B1. The channel allocation command indicates B1 is now responsible for the downlink channel and B2 for the uplink channel of the desired connection involving the mobile station. The channel allocation command also indicates the allocated traffic channels to be used for the connection.

The remaining steps for call set up between the mobile subscriber and the other subscriber are in accordance with the particular procedures of the mobile telecommunication system with the exception that B1 is responsible for transmitting call set up messages and information to the mobile station but B2 is responsible for receiving call set up messages or information from the mobile station. The invention may be implemented in various known systems that have more or less different call set up procedures. Such procedures in known systems are known per se and do not constitute part of the present invention. It is obvious to one skilled in the art how the remaining call set up steps should be adapted to the fact that different base stations are responsible for the uplink and the downlink. Accordingly there is no need to describe such call set up procedures here.

In the second case to be described the mobile station is the called party, i.e., the mobile station is located somewhere along the path between locations D and E in FIG. 3 and another party, e.g., another mobile station or a subscriber to a PSTN, desires a bidirectional connection involving the mobile station.

The process of setting up a connection starts when a call to the mobile station arrives at MSC. The MSC then orders transmission of a page message on the control channels of all base stations belonging to the location area where the mobile station is registered, including B1. When the mobile station receives the page message, it responds by transmitting an access message to the selected base station B2 on its control channel, indicating that a connection is required using B2 for the uplink and B1 for the downlink.

The access message from the mobile station is forwarded to MSC. The MSC checks whether there are any free traffic channels at B1 and B2. The MSC may check B1 first and subsequently B2 or vice versa. If such traffic channels are available the MSC first allocates a downlink traffic channel at B1 and subsequently an uplink traffic channel at B2. Alternatively the MSC may first allocate an uplink traffic channel at B2 and subsequently a downlink traffic channel at B1. The allocation of downlink traffic channel and uplink traffic channel by MSC may also be made simultaneously by deciding upon a pair of traffic channels.

After allocation of uplink and downlink traffic channels the MSC orders B1 to transmit a channel allocation command to the mobile station on the control channel of B1. The channel allocation command indicates B1 is now responsible for the downlink channel and B2 for the uplink channel of the connection involving the mobile station. The channel allocation command also indicates the allocated traffic channels.

The remaining steps for call set up between the mobile subscriber and the other subscriber are in accordance with the particular procedures of the mobile telecommunication system with the exception that B1 is responsible for transmitting call set up messages and information to the mobile station but B2 is responsible for receiving call set up messages or information from the mobile station. The invention may be implemented in various known systems that have more or less different call set up procedures. Such procedures in known systems are known per se and do not constitute part of the present invention. It is obvious to one skilled in the art how the remaining call set up steps should be adapted to the fact that different base stations are responsible for the uplink and the downlink. Accordingly there is no need to describe such call set up procedures here.

In a FDMA system a control channel or a traffic channel may be an entire radio frequency band e.g., 20 kHz. In a TDMA system a control channel may be an entire radio frequency band or plural time slots of a radio frequency band, while a traffic channel may be a time slot of a frequency band. In a CDMA system a control channel or a traffic channel may be a particular code.

The embodiments of methods according to the invention described so far are only examples of embodiments of methods according to the invention and should not be interpreted as the only possible embodiments. Other embodiments within the scope of the claims are possible but not herein disclosed, e.g., instead of using radio signals the mobile system may use other kinds of signals. Such other signals may preferably be optical signals.

I claim:

1. A method of bidirectional communication in a cellular mobile telecommunication system having cells of substantially different size and a base station for each cell, comprising the steps of:

assigning a first base station of a first larger cell for a downlink of a bidirectional connection involving a mobile station and a second base station of a second cell smaller than the first cell for an uplink of the bidirectional connection;

transmitting from the mobile station radio signals pertaining to the connection;

measuring the strength of radio signals from the mobile station received by the first and second base stations;

comparing the measured strength of signals from the mobile station with each other and at least one desired value;

transmitting power control messages from the first base station to the mobile station in response to the result of the comparison;

monitoring the downlink and the uplink of the connection; and when downlink handoff from the first cell to the second cell is desirable, performing handoff of the downlink of the connection from the first cell independently of handoff of the uplink of the connection.

2. A method according to claim 1, comprising the further steps of:

transmitting from the first and second base stations signals on control channels:

measuring at the mobile station the strength of signals received from the base stations on control channels; and using the measured strength of signals received on control channels for determining whether a handoff is desirable.

3. A method according to claim 2, comprising the further step of:

transmitting from the first base station on a control channel with substantially higher output power than the output power of transmission on a control channel from the second base station.

4. A method of bidirectional communication in a cellular mobile telecommunication system having a larger cell and at least one adjacent smaller cell and a base station for each cell, comprising the steps of:

assigning a first base station of the larger cell for a downlink of a bidirectional connection involving a mobile station;

transmitting from the mobile station radio signals pertaining to the connection;

measuring the strength of radio signals from the mobile station received by the first base station and by at least one base station of said at least one adjacent smaller cell;

comparing the measured strength of signals from the mobile station with each other and at least one desired value;

transmitting power control messages from the first base station to the mobile station in response to the result of the comparison;

monitoring the downlink and the uplink of the connection; and when downlink handoff from the larger cell to an adjacent smaller cell is desirable, performing handoff of the downlink of the connection from the first cell to the smaller adjacent cell independently of handoff of the uplink of the connection.

5. A method according to claim 4, comprising the further steps of:

transmitting from the first base station and said at least one base station signals on control channels;

measuring at the mobile station the strength of signals received from the base stations on control channels; and using the measured strength of signals received on control channels for determining whether a handoff is desirable.

6. A method according to claim 5, comprising the further step of:

transmitting from the first base station on a control channel with substantially higher output power than the output power of transmission on a control channel from said at least one base station.

7. A method of bidirectional communication in a cellular mobile telecommunication system having a larger cell and at least one adjacent smaller cell and a base station for each cell comprising the steps of:

assigning a first base station of the larger cell for a downlink of a bidirectional connection involving a mobile station;

assigning at least one base station of said at least one adjacent smaller cell for an uplink of the connection;

monitoring the downlink and the uplink of the connection; and when downlink handoff from the larger cell to an adjacent smaller cell is desirable performing a downlink handoff from the larger cell to the smaller cell independently of uplink handoff.

8. A method according to claim 7, comprising the further steps of:

transmitting from the first base station and said at least one base station signals on control channels;

measuring at the mobile station the strength of signals received from the base stations on control channels; and using the measured strength of signals received on control channels for determining whether a handoff is desirable.

9. A method according to claim 8, comprising the further step of:

transmitting from the first base station on a control channel with substantially higher output power than the output power of transmission on a control channel from said at least one base station.

10. A method of bidirectional communication in a cellular mobile telecommunication system having a larger cell and at least one adjacent smaller cell and a base station for each cell comprising the steps of:

assigning a first base station of the larger cell for a downlink of a bidirectional connection involving a mobile station;

assigning at least one base station of said at least one adjacent smaller cell for the uplink of the connection;

transmitting from the mobile station radio signals pertaining to the connection;

measuring the strength of radio signals from the mobile station received by the first base station and by said at least one base station of said at least one adjacent smaller cell;

comparing the measured strength of signals from the mobile station with each other and at least one desired value;

transmitting power control messages from the first base station to the mobile station in response to the result of the comparison;

monitoring the downlink and the uplink of the connection; and when downlink handoff from the larger cell to an adjacent smaller cell is desirable, performing a downlink handoff from the first cell to the adjacent cell independently of handoff of the uplink of the connection.

11. A method according to claim 10, comprising the further steps of:

transmitting from the first base station and said at least one base station signals on control channels;

measuring at the mobile station the strength of signals received from the base stations on control channels; and using the measured strength of signals received on control channels for determining whether a handoff is desirable.

12. A method according to claim 11, comprising the further step of:

transmitting from the first base station on a control channel with substantially higher output power than the output power of transmission on a control channel from said at least one base station.

13. A method of bidirectional communication in a cellular mobile telecommunication system having a larger cell and at least one smaller cell and a base station for each cell, comprising the steps of:

assigning a first base station of the larger cell for a downlink of a bidirectional connection involving a mobile station;

assigning at least a second station of a smaller cell for an uplink of the connection involving the mobile station;

transmitting from the mobile station radio signals pertaining to the connection;

measuring the strength of radio signals transmitted by the mobile station and received by the first base station and by said at least one base station of a smaller cell;

comparing the measured strength of signals from the mobile station received by the first and second base stations with each other and at least one desired value;

transmitting power control messages from the first base station to the mobile station in response to the result of the comparison in order to reduce the difference between the strongest measured strength of the mobile station signals and a desired value;

monitoring the downlink and the uplink of the bidirectional connection; and when handoff of a downlink of the connection is desirable from the larger cell to a smaller cell, performing a handoff of said downlink from the larger cell to the smaller cell without performing a handoff of an uplink of the connection involving said mobile station.

14. A method according to claim 13, comprising the further steps of:

transmitting from the first and second base stations signals on control channels:

measuring at the mobile station the strength of signals received from the base stations on control channels; and using the measured strength of signals received on control channels for determining whether a handoff is desirable.

15. A method according to claim 14, comprising the further step of:

transmitting from the first base station on a control channel with substantially higher output power than the output power of transmission on a control channel from said second base station.

* * * * *